(12) United States Patent
Nielsen et al.

(10) Patent No.: US 11,375,687 B2
(45) Date of Patent: Jul. 5, 2022

(54) CATTLE GUARD ASSEMBLY

(71) Applicants: Wayde Nielsen, Huntington, UT (US);
Tracy Nielsen, Huntington, UT (US)

(72) Inventors: Wayde Nielsen, Huntington, UT (US);
Tracy Nielsen, Huntington, UT (US)

( * ) Notice: Subject to any disclaimer, the term of this patent is extended or adjusted under 35 U.S.C. 154(b) by 1010 days.

(21) Appl. No.: 16/050,032

(22) Filed: Jul. 31, 2018

(65) Prior Publication Data
US 2020/0037576 A1 Feb. 6, 2020

(51) Int. Cl.
*A01K 3/00* (2006.01)

(52) U.S. Cl.
CPC .................... *A01K 3/002* (2013.01)

(58) Field of Classification Search
CPC ..................................... A01K 3/002
See application file for complete search history.

(56) References Cited

U.S. PATENT DOCUMENTS

| | | | |
|---|---|---|---|
| 1,616,361 A * | 2/1927 | Frnka ................. | A01K 3/002 49/33 |
| 2,686,041 A | 8/1954 | Cole | |
| 2,750,157 A * | 6/1956 | Van Alsburg .......... | A01K 3/002 256/17 |
| 2,846,194 A | 8/1958 | Wells | |
| 2,876,997 A * | 3/1959 | Hundahl ................ | A01K 3/002 256/14 |
| 3,322,399 A | 5/1967 | Sawyers | |
| 4,163,545 A * | 8/1979 | Ostermiller ........... | A01K 3/002 256/17 |
| 4,387,882 A * | 6/1983 | Mansour ................. | E01B 17/00 256/17 |
| 4,434,975 A * | 3/1984 | Tompkins ............. | A01K 3/002 404/8 |
| 9,707,697 B1 | 7/2017 | Hoenstine | |
| 2002/0176743 A1 | 11/2002 | Shumlansky | |
| 2013/0221305 A1 | 8/2013 | Dilworth | |

* cited by examiner

*Primary Examiner* — Monica L Barlow
*Assistant Examiner* — Brittany A Lowery

(57) ABSTRACT

A cattle guard assembly includes a cattle guard that is positionable in a depression in a roadway extending along a fence line. In this way the cattle guard inhibits livestock from crossing the fence line in the roadway. The cattle guard is comprised of a resiliently compressible material thereby resisting impact damage. Additionally, the cattle guard is comprised of a non-oxidizing material to resist corrosion. The cattle guard comprises a plurality of modular units thereby facilitating the cattle guard to have a selectable width for accommodating a variety of roadway widths. Each of the modular units is comprised of a molded, unitary structure such that said modular units resist breaking. Each of the modular units includes a base and a grate, and the grate is positionable in an existing cattle guard base for replacing an existing grate in an existing cattle guard.

4 Claims, 10 Drawing Sheets

CATTLE GUARD ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to guard devices and more particularly pertains to a new guard device for improving the lifespan and durability of existing, metal cattle guards.

BRIEF SUMMARY OF THE INVENTION

An embodiment of the disclosure meets the needs presented above by generally comprising a cattle guard that is positionable in a depression in a roadway extending along a fence line. In this way the cattle guard inhibits livestock from crossing the fence line in the roadway. The cattle guard is comprised of a resiliently compressible material thereby resisting impact damage. Additionally, the cattle guard is comprised of a non-oxidizing material to resist corrosion. The cattle guard comprises a plurality of modular units thereby facilitating the cattle guard to have a selectable width for accommodating a variety of roadway widths. Each of the modular units is comprised of a molded, unitary structure such that said modular units resist breaking. Each of the modular units includes a base and a grate, and the grate is positionable in an existing cattle guard base for replacing an existing grate in an existing cattle guard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
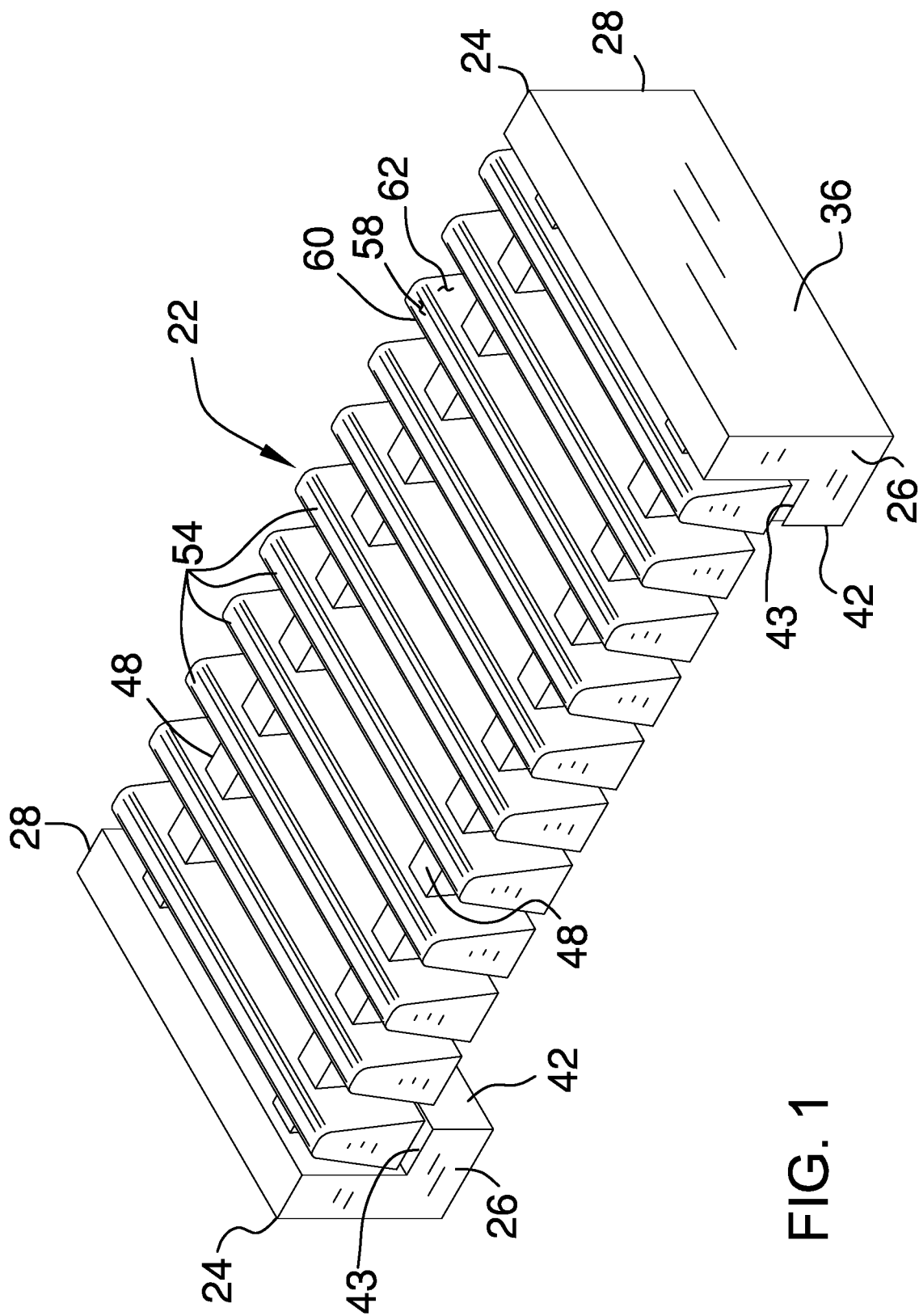
FIG. 1 is a top perspective view of a modular unit of a cattle guard assembly according to an embodiment of the disclosure.
Figure 2:
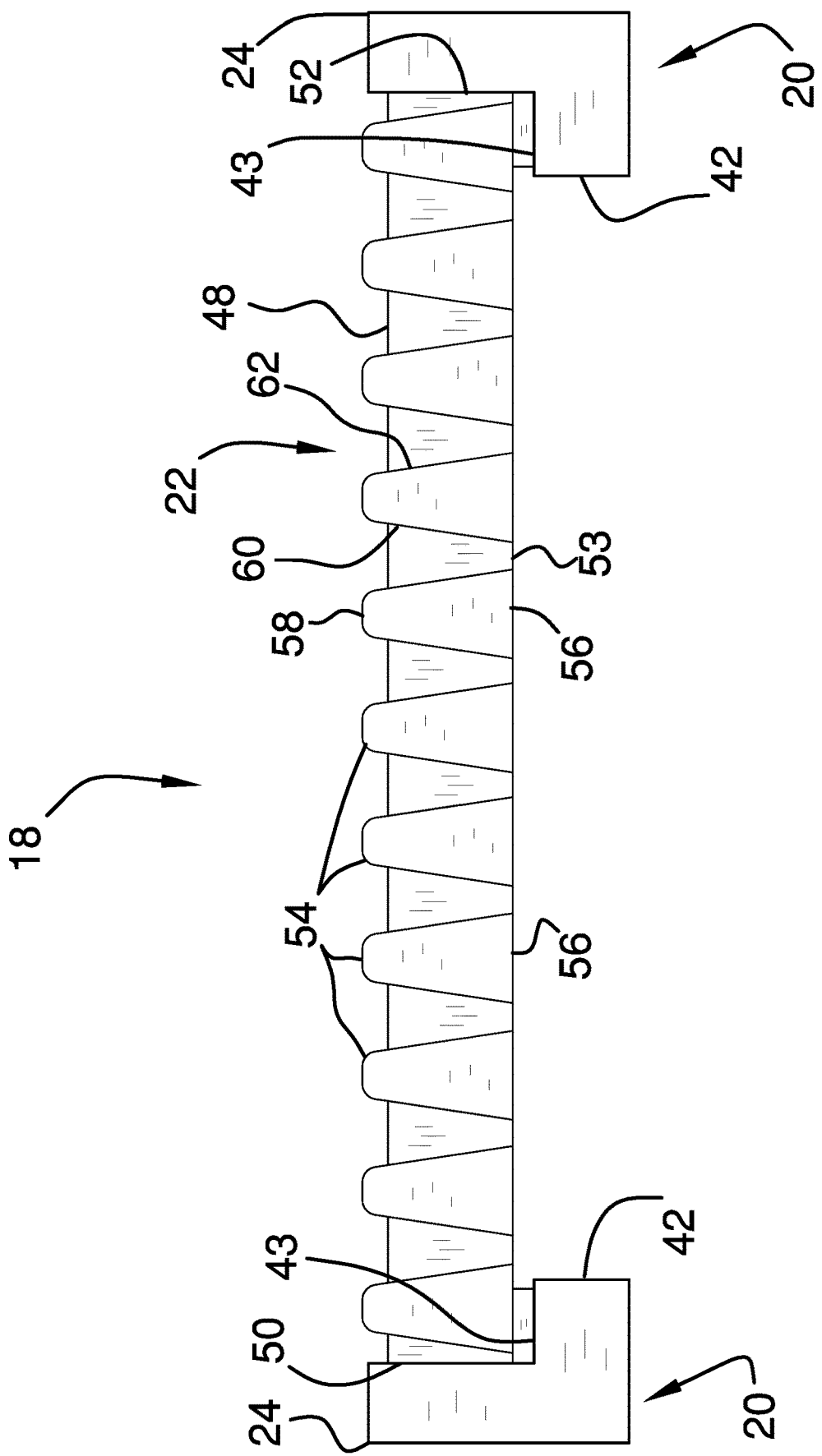
FIG. 2 is a front view of modular unit of an embodiment of the disclosure.
Figure 3:
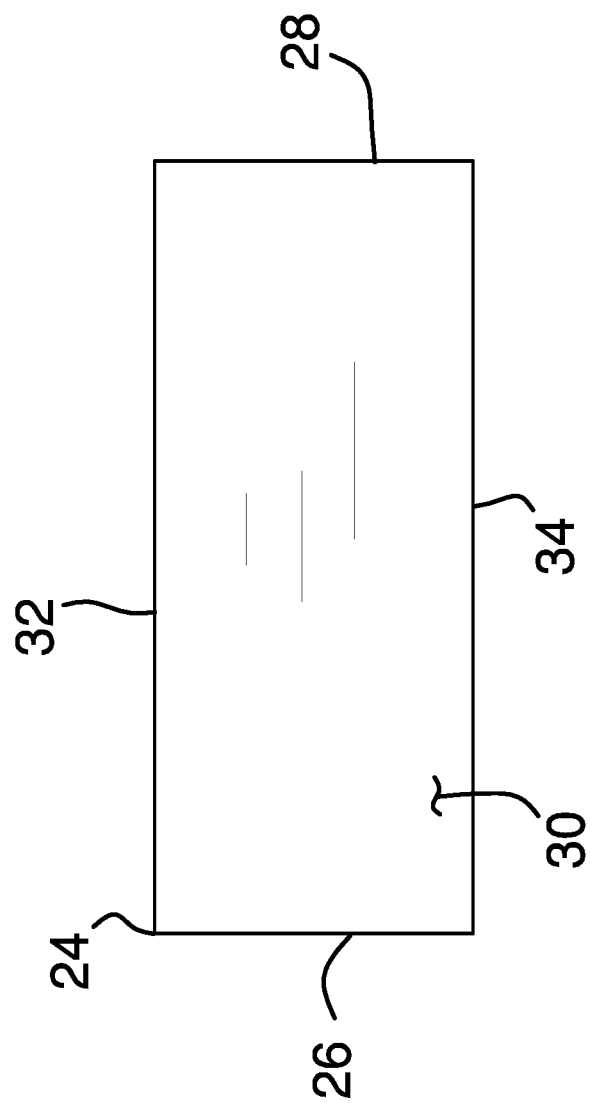
FIG. 3 is a right side view of an endplate of an embodiment of the disclosure.
Figure 4:
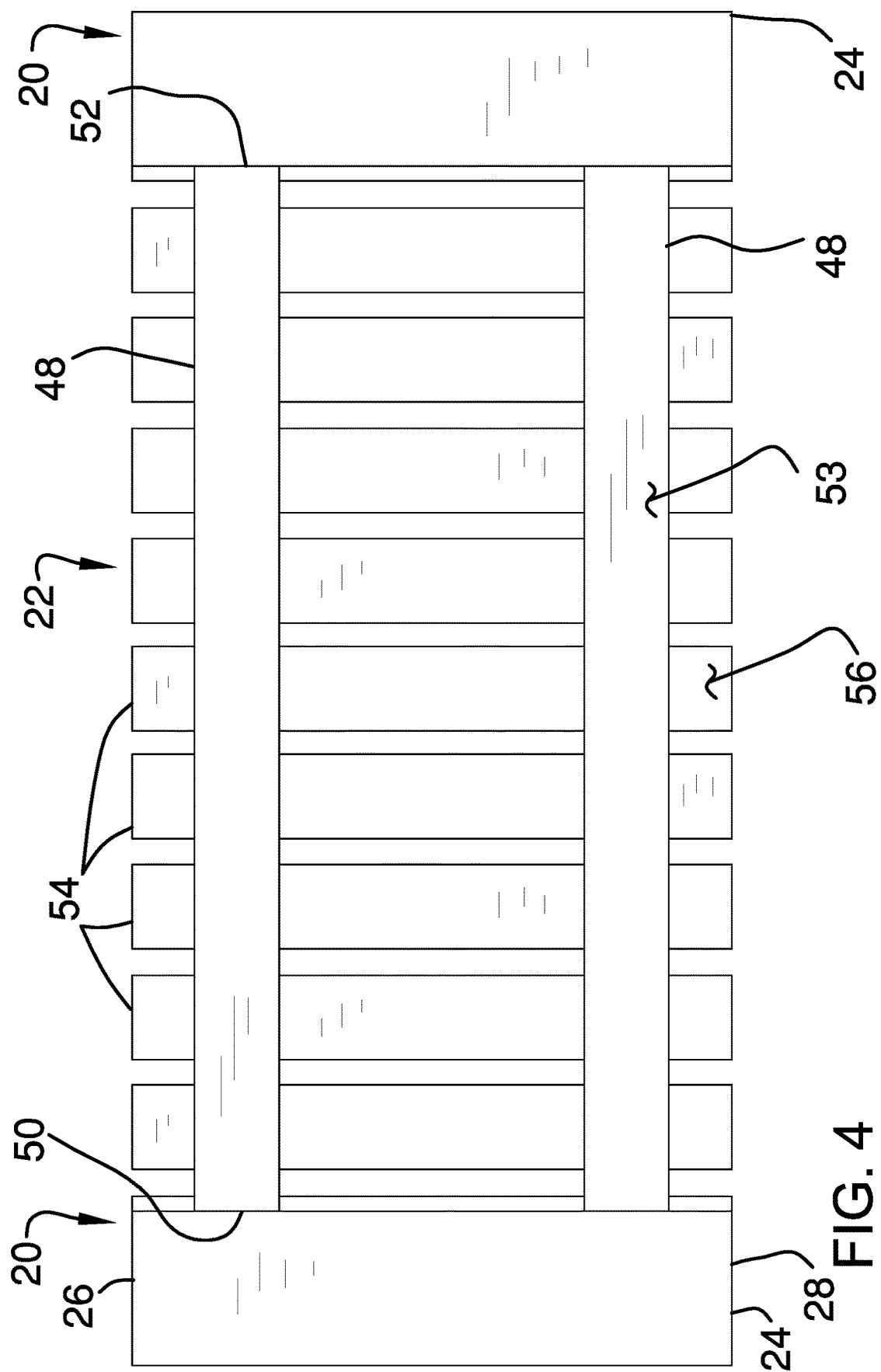
FIG. 4 is a bottom view of a modular unit of an embodiment of the disclosure.
Figure 5:
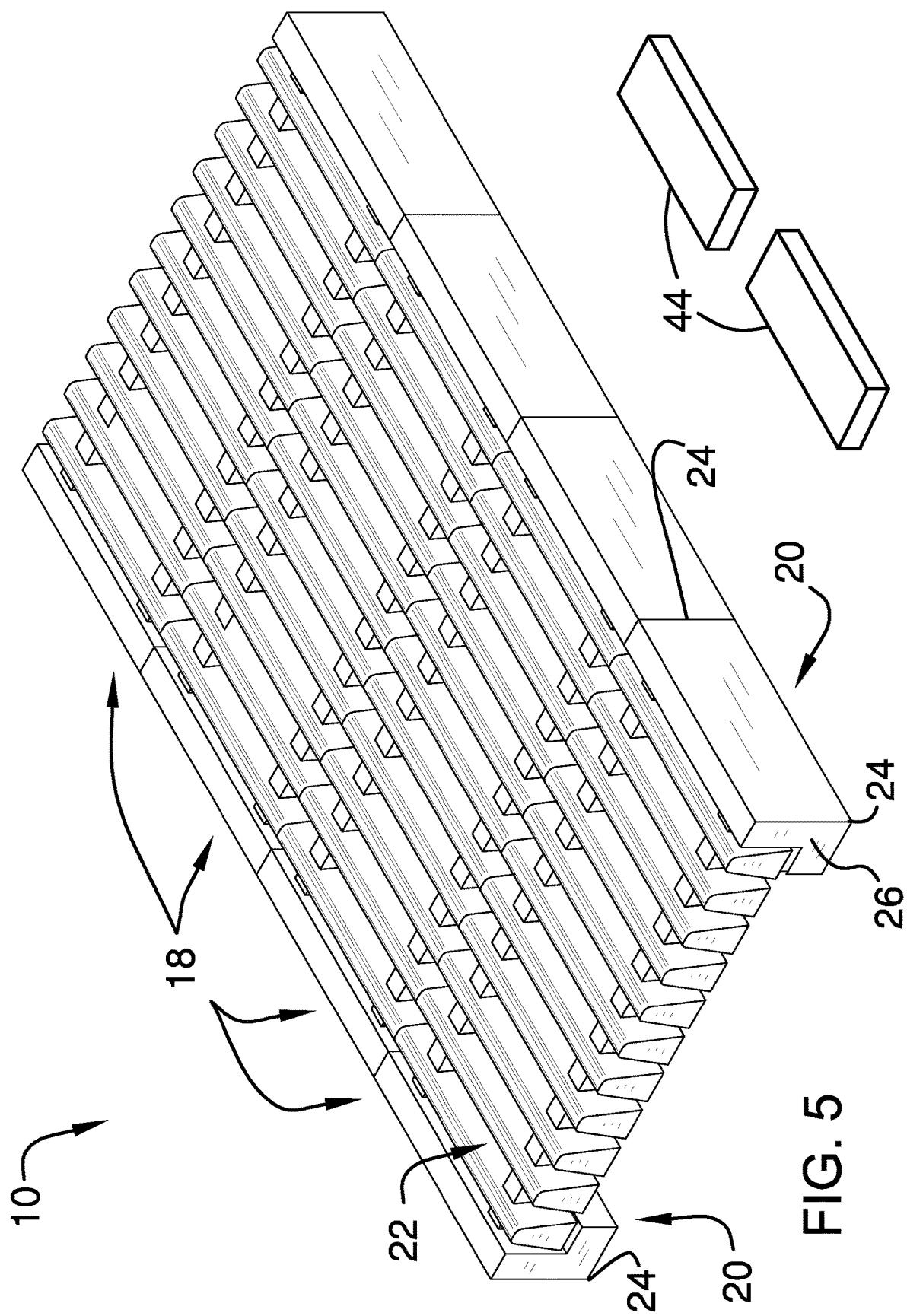
FIG. 5 is a top perspective view of an embodiment of the disclosure.
Figure 6:
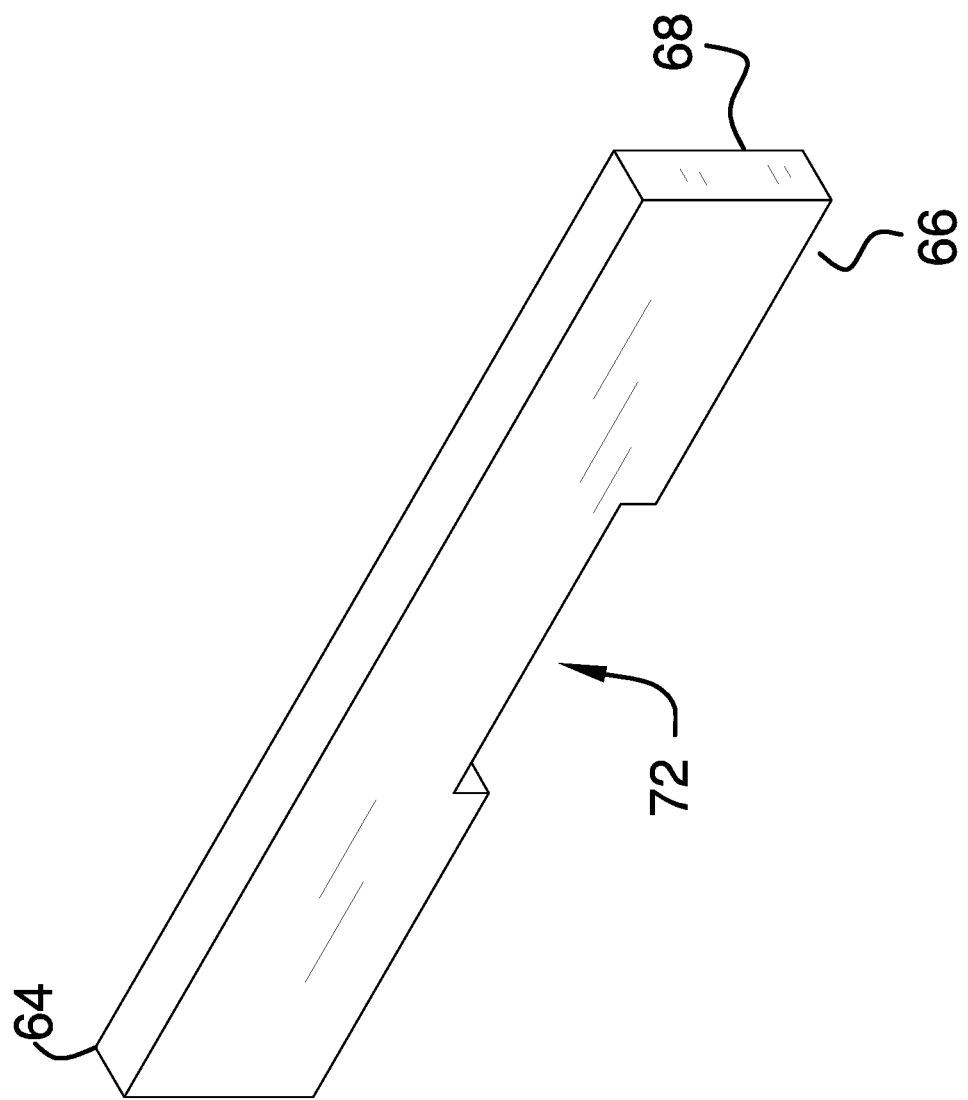
FIG. 6 is a right side perspective view of a panel of an embodiment of the disclosure.
Figure 7:
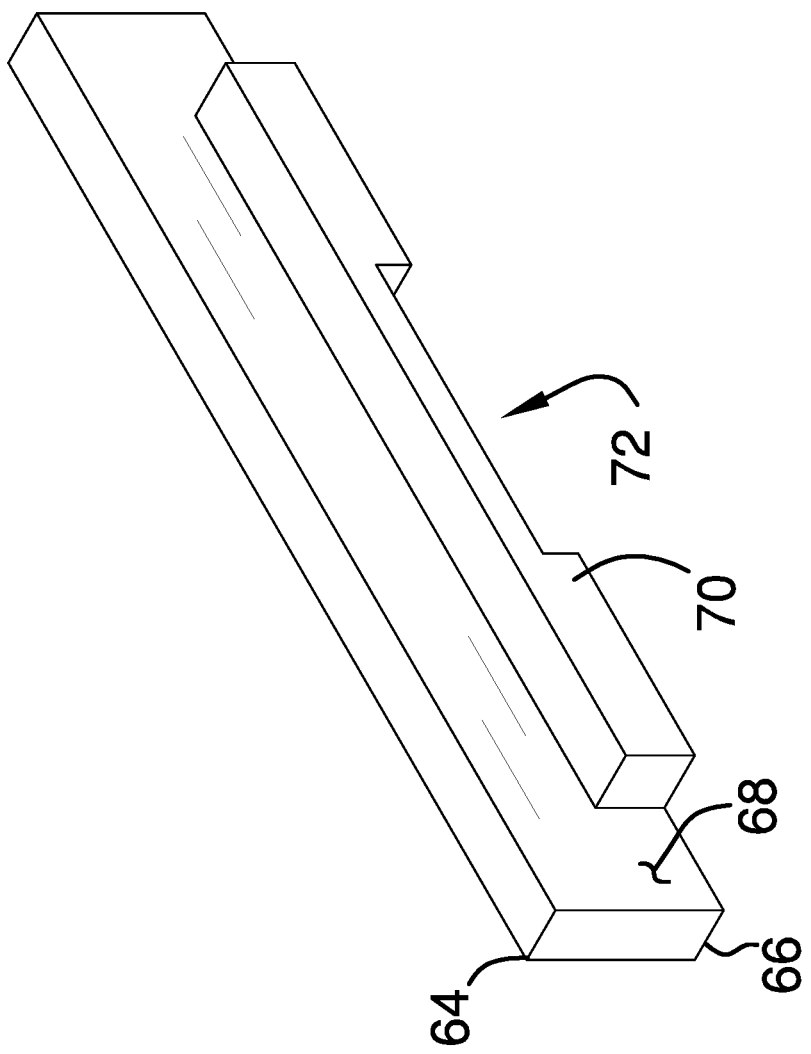
FIG. 7 is a left side perspective view of an embodiment of the disclosure.
Figure 8:
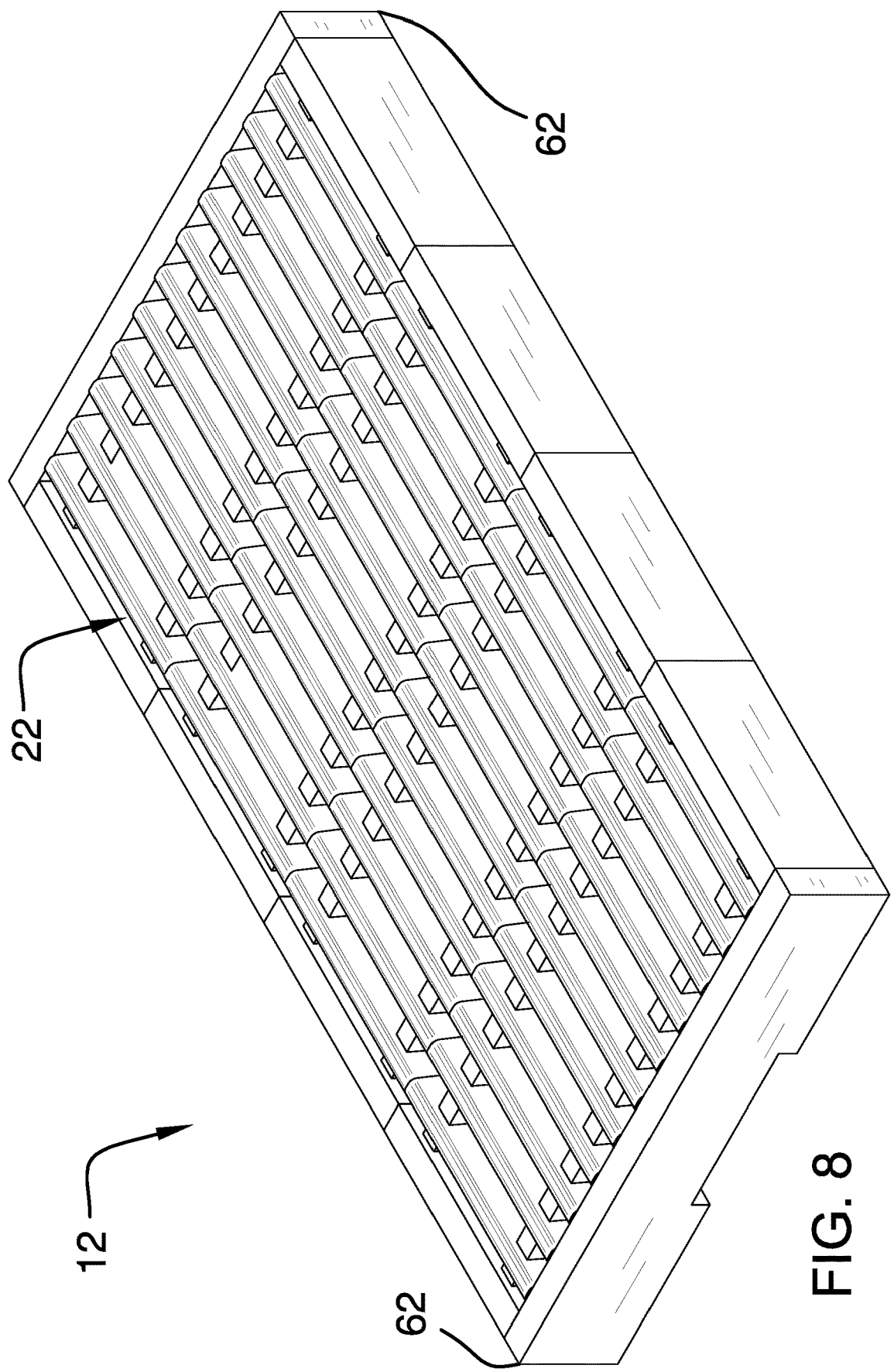
FIG. 8 is a perspective view of an embodiment of the disclosure showing panels being positioned on a cattle guard.
Figure 9:
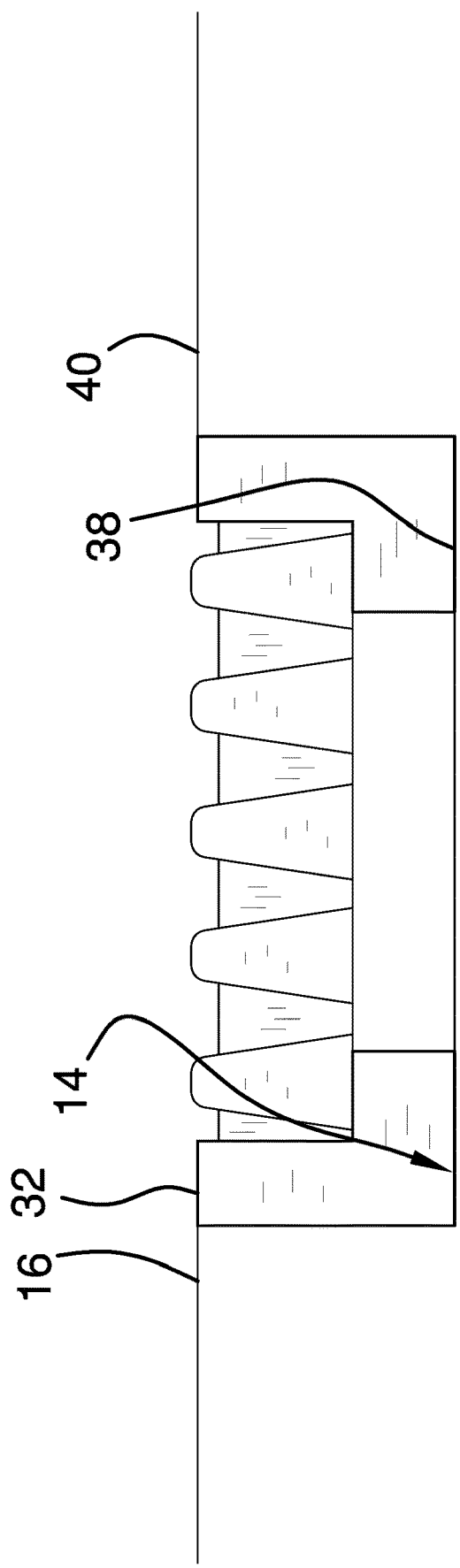
FIG. 9 is a perspective in-use view of an embodiment of the disclosure.

With reference now to the drawings, and in particular to FIGS. 1 through 10 thereof, a new guard device embodying the principles and concepts of an embodiment of the disclosure and generally designated by the reference numeral 10 will be described.

As best illustrated in FIGS. 1 through 6, the cattle guard assembly 10 generally comprises a cattle guard 12 that is positionable in a depression 14 in a roadway 16 extending along a fence line. Thus, the cattle guard 12 inhibits livestock from crossing the fence line in the roadway 16. The cattle guard 12 is comprised of a resiliently compressible material, such as rubber or a rubber composite, thereby facilitating the cattle guard 12 to resist impact damage. In this way the cattle guard 12 improves upon existing cattle guard 12 construction involving metal components that are prone to breakage and deformation.

The cattle guard 12 is comprised of a non-oxidizing material to resist corrosion. In this way the cattle guard 12 improves upon existing cattle guard construction involving corrosion prone metal components. Moreover, the cattle guard 12 is comprised of a molded, unitary structure such that the cattle guard 12 resists breaking. In this way the cattle guard 12 improves upon existing cattle guard construction involving welds or other joints that are prone to breakage.

The cattle guard 12 comprises a plurality of modular units 18 thereby facilitating the cattle guard 12 to have a selectable width. In this way the cattle guard 12 can accommodate a variety of roadway 16 widths. Each of the modular units 18 may have a width of approximately 1.2 meters. Each of the modular units 18 includes a base 20 and a grate 22. The grate 22 is positionable in an existing cattle guard base for replacing an existing grate in an existing cattle guard. In this way an existing, damaged metal grate can be replaced without requiring the existing base to be removed and replaced.

The base 20 comprises a pair of end plates 24 that each has primary end 26, a secondary end 28 and an outer surface 30 extending therebetween. The outer surface 30 of each of the end plates 24 has a top side 32, a bottom side 34 and a front side 36. The bottom side 34 of each of the end plates 24 rests on a bottom surface 38 of the depression 14 in the roadway 16 having the top side 32 being aligned with a top surface 40 of the roadway 16.

Each of the end plates 24 has a foot 42 extending away from the front side 36. The foot 42 is aligned with the bottom side 34 of the end plate 24 and is coextensive with the end plate 24. Additionally, the foot 42 on each of the end plates 24 has a top side 43 and each of the end plates 24 has a height of approximately 27.94 centimeters. A pair of spacers 44 is provided and each of the spacers 44 is positionable beneath the end plates 24 in the depression 14 in the roadway 16 when the depression 14 has a depth greater than 27.94 centimeters. Thus, each of the spacers 44 elevates the end plates 24 thereby facilitating the top side 32 of the outer surface 30 of the end plates 24 to be aligned with the top surface 40 of the roadway 16.

The grate 22 comprises a pair of cross bars 48 that each has a first end 50, a second end 52 and a lower surface 53 extending therebetween. Each of the cross bars 48 is elongated between the first 50 and second 52 ends to length of approximately 3.0 meters. The lower surface 53 of each of the cross bars 48 rests on the top side 43 of the foot 42 on each of the members 54. Each of the first 50 and second 52 ends of each of the cross bars 48 is aligned with the front side 36 of the outer surface 30 of a respective one of the end plates 24 such that the end plates 24 are spaced apart from each other having each of the cross bars 48 being oriented perpendicular to the end plates 24. Moreover, the cross bars 48 are spaced apart from each on the end plates 24.

The grate 22 includes a plurality of members 54 that each has a lower surface 56, an upper surface 58, a front surface 60 and a back surface 62. Each of the front 60 and back 62 surfaces tapers inwardly between the lower 56 and upper 58 surfaces. Thus, each of the members 54 has a trapezoidal cross section taken along a longitudinal axis of the members 54. Each of the members 54 is integrated into and extends between the pair of cross bars 48 having the lower surface 53 of each of the members 54 being aligned with the lower surface 53 of the cross bars 48. Additionally, each of the members 54 is oriented perpendicular to the cross bars 48.

The upper surface 58 of each of the members 54 is aligned with top side 32 of the outer surface 30 of the end plates 24 when the cross bars 48 are positioned on the foot 42 on each of the end plates 24. The members 54 are spaced apart from each other and are distributed between the end plates 24 to inhibit livestock from walking across the members 54. In this way the livestock are inhibited from crossing the fence line in the roadway 16. Each of the members 54 has a length that is equal to a length of each of the end plates 24.

A pair of panels 64 is provided and each of the panels 64 is positionable on opposite sides of the cattle guard 12. Each of the panels 64 has a lowermost surface 66 and a first lateral surface 68, and the first surface 68 on each of the panels 64 has a protrusion 70 extending laterally away from the first surface 68. The protrusion 70 on each of the panels 64 is aligned with the lowermost surface 66. The protrusion 70 on each of the panels 64 extends beneath the lower surface 53 of each of the members 54 when the panels 64 are positioned on opposite sides of the cattle guard 12. Additionally, the lower surface 53 of each of the panels 64 has a notch 72 extending upwardly therein to facilitate rain to drain therethrough.

Figure 10:
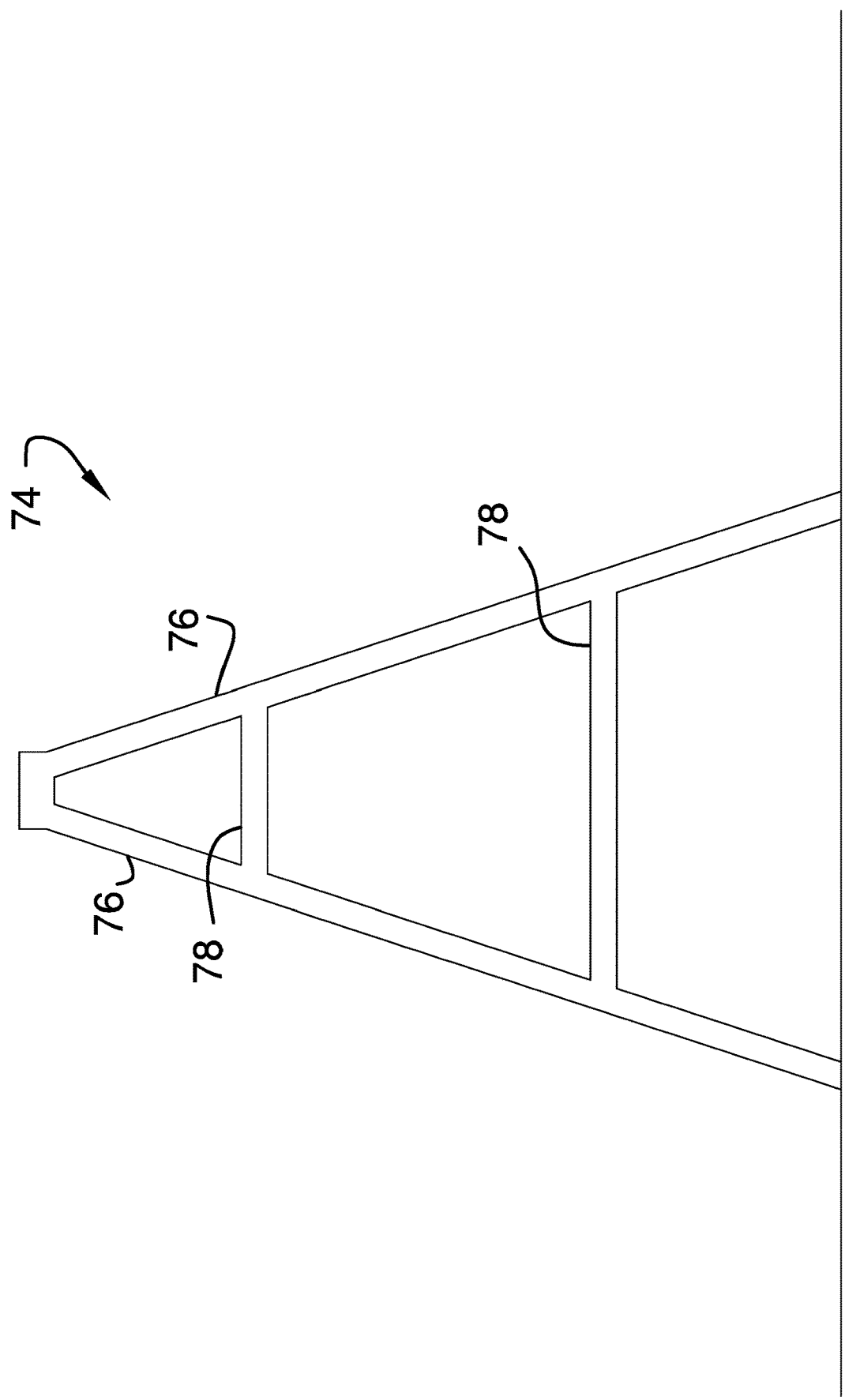
FIG. 10 is a perspective view of an end gate of an embodiment of the disclosure.

As shown in FIG. 10, an end gate 74 is provided that includes a pair of uprights 76 and a plurality of supports 78 extending therebetween. The uprights angle 76 away from each other such that the end gate 74 has a triangular shape. Thus, the end gate 74 may be positioned between a fence post and the cattle guard 12 thereby inhibiting livestock from walking around the cattle guard 12. Additionally, the end gate 74 is comprised of the same material of which the cattle guard 12 is comprised.

In use, the existing, damaged grate in an existing cattle guard can be removed and replaced with the grate 22 of the modular unit 18. Thus, the existing cattle guard can be repaired without requiring removal and replacement of the existing base of the existing cattle guard. Alternatively, the entire existing cattle guard, including the existing grate and the existing base, can be removed from the roadway 16 and replaced with the base 20 and the grate 22 of a selected number of the modular units 18. In the case that the existing depression 14 in the roadway 16 has a depth of 33 centimeters, the spacers 44 are positioned beneath the end plates 24. In this way the top side 32 of the outer surface 30 of the end plates 24 is aligned with the top surface 46 of the roadway 16.

The material of which the modular units 18 are constructed inhibits the cattle guard 12 from being damaged by vehicles or livestock and inhibits the cattle guard 12 from corroding. Thus, the cattle guard 12 comprising the modular units 18 have an improved lifespan and durability with respect to existing, metal cattle guards.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cattle guard assembly being comprised of a molded grid formed from a rubber or rubber composite material wherein said assembly is configured to resist being damaged by livestock and corrosion, said assembly comprising:

a cattle guard being positionable in a depression in a roadway extending along a fence line wherein said cattle guard is configured to inhibit livestock from crossing the fence line in the roadway, said cattle guard being comprised of a resiliently compressible material wherein said cattle guard is configured to resist impact damage, said cattle guard being comprised of a non-oxidizing material wherein said cattle guard is configured to resist corrosion, said cattle guard comprising a plurality of modular units thereby facilitating said cattle guard to have a selectable width wherein said cattle guard is configured to accommodate a variety of roadway widths, said modular units being comprised of a molded, unitary structure such that said modular units resist breaking, each of said modular units including a base and a grate, said grate being positionable in an existing cattle guard base for replacing an existing grate in an existing cattle guard;

wherein said base comprises a pair of end plates, each of said end plates having a primary end, a secondary end and an outer surface extending therebetween, said outer surface of each of said end plates having a top side, a bottom side and a front side, said bottom side of each of said end plates resting on a bottom surface of the depression in the roadway having said top side being aligned with a top surface of the roadway;

wherein each of said end plates having a foot extending away from said front side, said foot being aligned with said bottom side of said end plate and being coextensive with said end plate, said foot on each of said end plates having a top side;

wherein each of said end plates having a height of approximately 27.94 centimeters;

wherein said grate comprises a pair of cross bars, each of said cross bars having a first end, a second end and a lower surface extending therebetween, each of said cross bars being elongated between said first and second ends, said lower surface of each of said cross bars resting on said top side of said foot on each of said end plates having each of said first and second ends of each of said cross bars being aligned with said front side of said outer surface of a respective one of said end plates such that said end plates are spaced apart from each other having each of said cross bars being oriented perpendicular to said end plates, said cross bars being spaced apart from each other;

plurality of members, each of said members having a lower surface, an upper surface, a front surface and a back surface, each of said front and back surfaces tapering inwardly between said lower and upper surfaces such that each of said members has a trapezoidal cross section taken along a longitudinal axis of said members, each of said members being integrated into and extending between said pair of cross bars having said lower surface of each of said members being aligned with said lower surface of said cross bars, each of said members being oriented perpendicular to said cross bars; and a pair of panels, each of said panels being positionable on opposite sides of said cattle guard, each of said panels having a lowermost surface and a first lateral surface, said first surface on each of said panels having a protrusion extending laterally away from said first surface, said protrusion on each of said panels being aligned with said lowermost surface said protrusion on each of said panels extending beneath said lower surface of each of said members when said panels are positioned on opposite sides of said cattle guard, said lower surface of each of said panels having a notch extending upwardly therefrom wherein said notch is configured to facilitate rain to drain therethrough.

2. The assembly according to claim 1, further comprising a pair of spacers, each of said spacers being positionable beneath said end plates in the depression in the roadway when the depression has a depth greater than 27.94 centimeters, each of said spacers elevating said end plates thereby facilitating said top surface of said end plates to be aligned with a top surface of the roadway.

3. The assembly according to claim 1, wherein said upper surface of each of said members is aligned with top side of said outer surface of said end plates when said cross bars are positioned on said foot on each of said end plates, said members being spaced apart from each other and being distributed between said end plates wherein said members are configured to inhibit livestock from walking across said member thereby inhibiting the livestock from crossing the fence line in the roadway, each of said members having a length being equal to a length of each of said end plates.

4. A cattle guard assembly being comprised of a molded grid formed from a rubber or rubber composite material wherein said assembly is configured to resist being damaged by livestock and corrosion, said assembly comprising:

a cattle guard being positionable in a depression in a roadway extending along a fence line wherein said cattle guard is configured to inhibit livestock from crossing the fence line in the roadway, said cattle guard being comprised of a resiliently compressible material wherein said cattle guard is configured to resist impact damage, said cattle guard being comprised of a non-oxidizing material wherein said cattle guard is configured to resist corrosion, said cattle guard comprising a plurality of modular units thereby facilitating said cattle guard to have a selectable width wherein said cattle guard is configured to accommodate a variety of roadway widths, each of said modular units being comprised of a molded, unitary structure such that said modular units resist breaking, each of said modular units including a base and a grate, said grate being positionable in an existing cattle guard base for replacing an existing grate in an existing cattle guard, said base comprising:

a pair of end plates, each of said end plates having a primary end, a secondary end and an outer surface extending therebetween, said outer surface of each of said end plates having a top side, a bottom side and a front side, said bottom side of each of said end plates resting on a bottom surface of the depression in the roadway having said top side being aligned with a top surface of the roadway, each of said end plates having a foot extending away from said front side, said foot being aligned with said bottom side of said end plate and being coextensive with said end plate, said foot on each of said end plates having a top side, each of said end plates having a height of approximately 27.94 centimeters; and a pair of spacers, each of said spacers being positionable beneath said end plates in the depression in the roadway when the depression has a depth greater than 27.94 centimeters, each of said spacers elevating said end plates thereby facilitating said top surface of said end plates to be aligned with a top surface of the roadway;

said grate comprising:

a pair of cross bars, each of said cross bars having a first end, a second end and a lower surface extending therebetween, each of said cross bars being elongated between said first and second ends, said lower surface of each of said cross bars resting on said top side of said foot on each of said end plates having each of said first and second ends of each of said cross bars being aligned with said front side of said outer surface of a respective one of said end plates such that said end plates are spaced apart from each other having each of said cross bars being oriented perpendicular to said end plates, said cross bars being spaced apart from each other; and a plurality of members, each of said members having a lower surface, an upper surface, a front surface and a back surface, each of said front and back surfaces tapering inwardly between said lower and upper surfaces such that each of said members has a trapezoidal cross section taken along a longitudinal axis of said members, each of said members being integrated into and extending between said pair of cross bars having said lower surface of each of said members being aligned with said lower surface of said cross bars, each of said members being oriented perpendicular to said cross bars, said upper surface of each of said members being aligned with top side of said outer surface of said end plates when said cross bars are positioned on said foot on each of said end plates, said members being spaced apart from each other and being distributed between said end plates wherein said members are configured to inhibit livestock from walking across said member thereby inhibiting the livestock from crossing the fence line in the roadway, each of said members having a length being equal to a length of each of said end plates; and a pair of panels, each of said panels being positionable on opposite sides of said cattle guard, each of said panels having a lowermost surface and a first lateral surface, said first surface on each of said panels having a protrusion extending laterally away from said first surface, said protrusion on each of said panels being aligned with said lowermost surface, said protrusion on each of said panels extending beneath said lower surface of each of said members when said panels are positioned on opposite sides of said cattle guard, said lower surface of each of said panels having a notch extending upwardly therefrom wherein said notch is configured to facilitate rain to drain therethrough.

\* \* \* \* \*